United States Patent
Bonawandt et al.

(10) Patent No.: US 12,441,229 B1
(45) Date of Patent: Oct. 14, 2025

(54) HAULING VEHICLE AND METHOD OF USE

(71) Applicants: Craig Raymond Bonawandt, Northport, NY (US); Jean Carol Bonawandt, Northport, NY (US)

(72) Inventors: Craig Raymond Bonawandt, Northport, NY (US); Jean Carol Bonawandt, Northport, NY (US)

(*) Notice: Subject to any disclaimer, the term of this patent is extended or adjusted under 35 U.S.C. 154(b) by 367 days.

(21) Appl. No.: 18/123,571

(22) Filed: Mar. 20, 2023

Related U.S. Application Data

(60) Provisional application No. 63/350,909, filed on Jun. 10, 2022.

(51) Int. Cl.
| | | |
|---|---|---|
| *B60P 3/073* | (2006.01) | |
| *B60L 50/60* | (2019.01) | |
| *B60P 7/135* | (2006.01) | |
| *B62B 3/00* | (2006.01) | |
| *B62B 5/00* | (2006.01) | |

(52) U.S. Cl.
CPC ............ *B60P 3/073* (2013.01); *B60L 50/60* (2019.02); *B60P 7/135* (2013.01); *B62B 3/002* (2013.01); *B62B 5/0026* (2013.01); *B62B 2202/90* (2013.01); *B62B 2203/20* (2013.01)

(58) Field of Classification Search
CPC . B60P 3/073; B62B 3/002; B62B 3/02; B62B 3/12; B62B 5/0026; B62B 5/0046; B62B 5/06; B60L 50/60
USPC .......................................................... 414/572
See application file for complete search history.

(56) References Cited

U.S. PATENT DOCUMENTS

| | | | | |
|---|---|---|---|---|
| 4,796,909 | A * | 1/1989 | Kirkendall | B62B 3/02 180/906 |
| 5,310,202 | A * | 5/1994 | Goodspeed | A63C 17/12 280/11.115 |
| 7,210,545 | B1 * | 5/2007 | Waid | B62B 3/12 180/19.1 |
| 7,237,632 | B2 * | 7/2007 | Liao | B62B 5/0046 180/68.5 |
| 8,540,213 | B2 * | 9/2013 | Feiquan | B66F 9/22 414/664 |
| 2016/0001167 | A1 * | 1/2016 | Anderson | A63C 17/015 180/181 |
| 2021/0139098 | A1 * | 5/2021 | Carrasco Vergara | B62K 11/02 |
| 2022/0089207 | A1 * | 3/2022 | Gavin | B62B 3/02 |

FOREIGN PATENT DOCUMENTS

| | | | | |
|---|---|---|---|---|
| CN | 106926882 | A * | 7/2017 | B62B 3/02 |
| CN | 107055404 | A * | 8/2017 | B66F 9/07572 |
| CN | 107572448 | A * | 1/2018 | B62B 5/06 |

* cited by examiner

Primary Examiner — Terrell H Matthews
(74) Attorney, Agent, or Firm — Ted Masters

(57) ABSTRACT

A hauling vehicle includes (1) a hauler having a bed, (2) a powered board having a body, four wheels, a rechargeable battery, and a remote controller, and (3) a bracket which removably connects the powered board to the hauler so that the body of powered board is disposed below the bed of hauler. After use, the powered board can be easily disconnected from the hauler and stored in a safe protected location.

15 Claims, 4 Drawing Sheets

HAULING VEHICLE AND METHOD OF USE

CROSS REFERENCE TO RELATED APPLICATION

This application claims the filing benefit under 35 U.S.C. § 119 (e) of U.S. Provisional Application No. 63/350,909, filed Jun. 10, 2022, which is hereby incorporated by reference.

TECHNICAL FIELD

The present invention pertains generally to hauling, and more particularly to a hauling vehicle which has a detachable power source.

BACKGROUND OF THE INVENTION

Haulers such as wagons, carts, or the like are well known in the art for transporting a load from one location to another. These haulers can have a handle by which they are pulled by a user. If the load is heavy the process of moving the hauler can be difficult.

BRIEF SUMMARY OF THE INVENTION

The present invention is directed to a hauling vehicle which is powered by a power source. The hauling vehicle includes a hauler which carries a load, a power source, and a bracket which connects the two. In an embodiment the power source is a powered board which is easily removed from the hauling vehicle for portability and storage in a secure and protected environment away from the elements. Whereas the hauler part of the vehicle can be stored outside in the elements on a regular basis. The bracket that attaches to the hauler is "semi permanent", in that can be left in place during load hauling, but can be removed after use.

In accordance with an embodiment, a hauling vehicle includes a hauler which has a bed, a powered board having a body, four wheels, a rechargeable battery, and a remote controller, a bracket which removably connects the powered board to the hauler so that the body of the powered board is disposed below the bed of the hauler. 1. In accordance with another embodiment, the hauler includes a rear upstanding wall. The bracket is removably connected to the rear upstanding wall.

In accordance with another embodiment, the bracket is removably connected to the body of the powered board.

In accordance with another embodiment, the hauling vehicle is positioned upon a support surface wherein the four powered board wheels rest upon the support surface. The hauler has two front hauler wheels and two rear hauler wheels. The two front hauler wheels rest upon the support surface, and the two rear hauler wheels are elevated a distance above the support surface.

In accordance with another embodiment, the elevated distance is about 0.5 inches.

In accordance with another embodiment, the hauler has a first longitudinal axis, and the powered board has a second longitudinal axis. The first longitudinal axis and the second longitudinal axis are coplanar.

In accordance with another embodiment, the remote controller is connected to the handle of the hauler.

Other embodiments, in addition to the embodiments enumerated above, will become apparent from the following detailed description, taken in conjunction with the accompanying drawings, which illustrate, by way of example, the principles of the hauling vehicle and method of use.

DETAILED DESCRIPTION OF THE INVENTION

Figure 1:
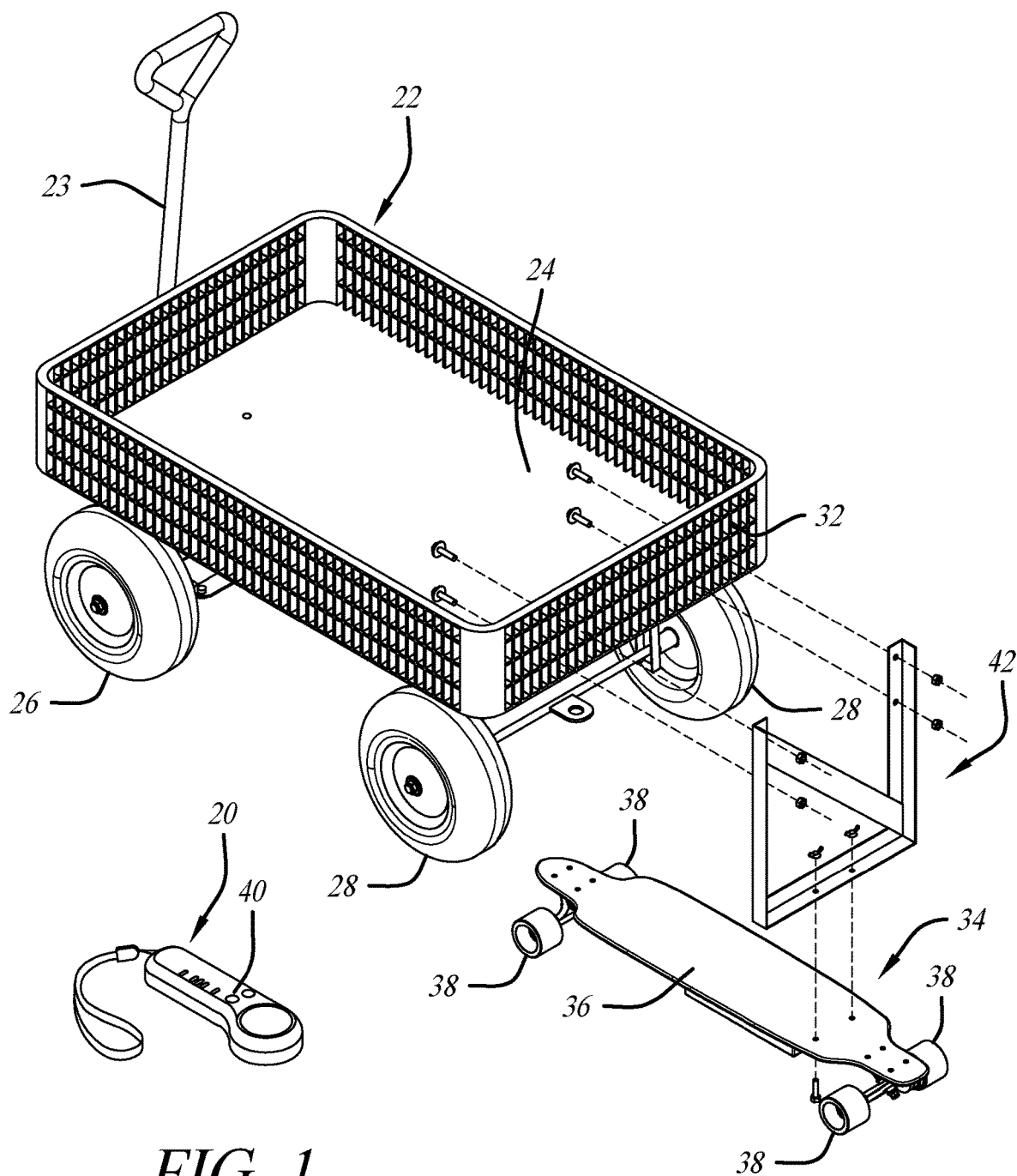
FIG. 1 is an exploded perspective view of a hauling vehicle with a detachable power source.
Figure 2:
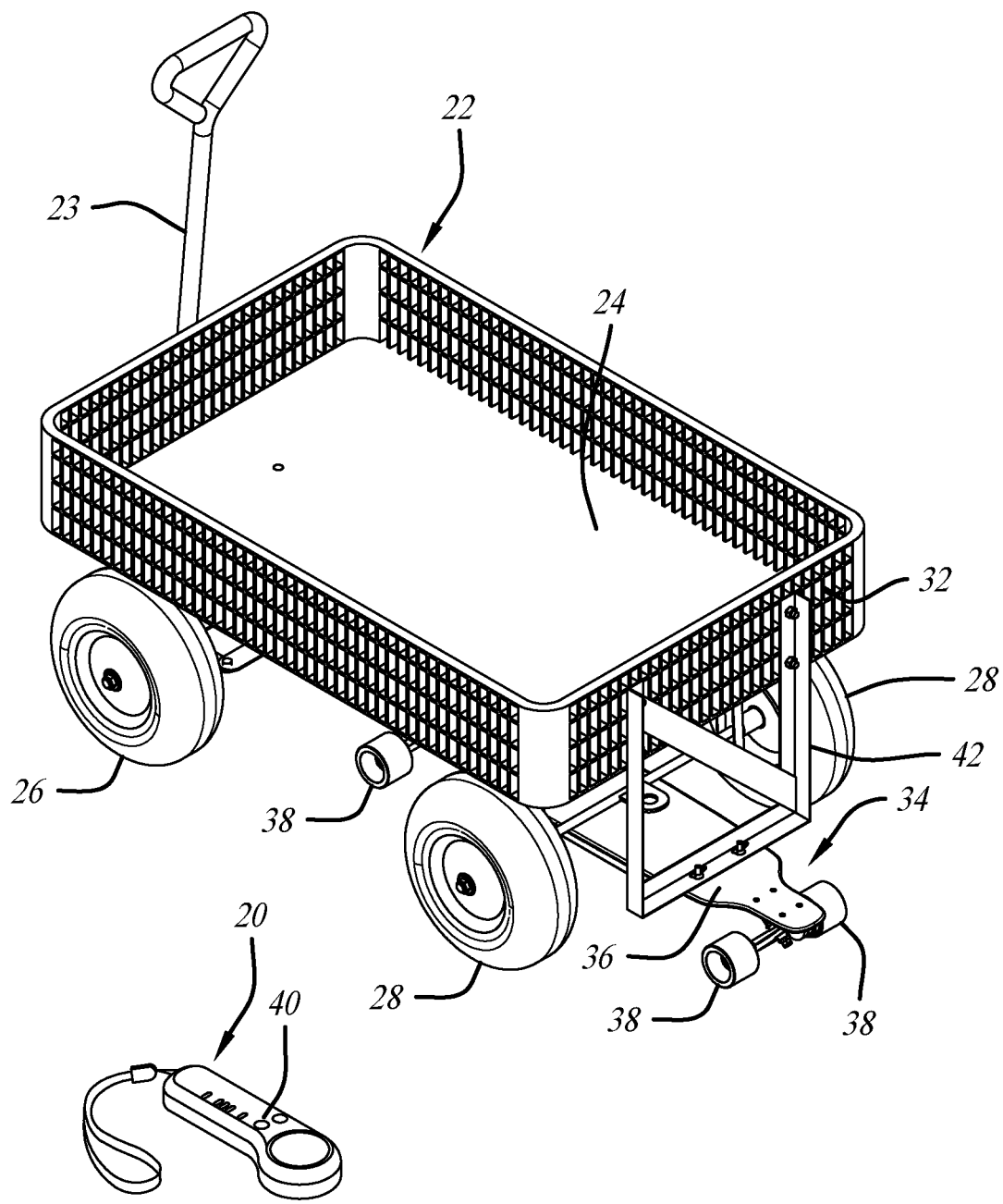
FIG. 2 is a perspective view of the hauling vehicle.

Referring to FIGS. 1-4 there are illustrated exploded perspective, perspective, side elevation, and top plan views respectively of a hauling vehicle, generally designated as 20. In the shown embodiment hauling vehicle 20 includes a hauler 22 which has a bed 24, a pulling handle 23, two front hauler wheels 26, and two rear hauler wheels 28. Bed 24 is surrounded by four upstanding walls, one of which is a rear upstanding wall 32. A load 500 can be placed in bed 24 for transporting. In the shown embodiment hauler 22 is a crate wagon. However, it may be appreciated that other types of haulers 22 such as carts or other wheeled vehicles could be utilized. Hauler 22 would typically be used on hard support surfaces 600 such as concrete, asphalt, wood decks (i.e. boardwalks), or hard ground. Without a source of power, hauler 22 would typically be hand pulled by a user. However, in accordance with the present hauling vehicle 20, hauler 22 has been retrofitted, or is built new, with a propelling power source.

Hauling vehicle 20 further includes a power source to effect powered movement. In the shown embodiment the power source is a commercially available powered board 34 (as shown a motorized skateboard) having a wood or metal body 36 (a platform for standing in conventional use), four wheels 38 (at least one of which is powered), and a rechargeable battery 39. However, it may be appreciated that powered board 34 could also be custom designed specially for hauling vehicle 20, wherein it could be smaller than conventional skateboards. Powered board 34 further includes a remote controller 40 for controlling movement forward or backward as shown by the arrows in FIG. 3. Powered board 34 is removably connected (detachable) to hauler 22 by a bracket 42 (see discussion below). Powered board 34 is easily installed, removed, and transported to location which is secure and protected from the elements when hauler 22 is stored outdoors.

In the shown embodiment, two of the wheels 38 of powered board 34 have hub motors, and battery power pack and control electronics mounted on the board. Powered board 34 is operated with a hand held wireless remote controller 40 to easily control the speed and braking, and for changing gears. In the shown embodiment, powered board 34 is driven by two 350-watt high performance brushless motors. The two rear 3.25" (83 mm) diameter by 2" (51 mm) wheels each have hub motors. The electric drive has three speed gears with braking, and forward and reverse modes. Three gears allow for hauling on varying slopes and weight loads. It can also "free wheel" in the event of power loss. The powered board is equipped with a new generation 29.4-volt rechargeable lithium battery. It only takes 3 hours to be fully charged. The prototype has a 2.4 GHz hand held remote controller 40. Moreover, the design of the present hauling vehicle 20 can accommodate varying size powered boards 34. The prototype is a 9" wide by 37" long "powered board". However, a shorter board will provide more convenience, in transporting and installation.

Figure 3:
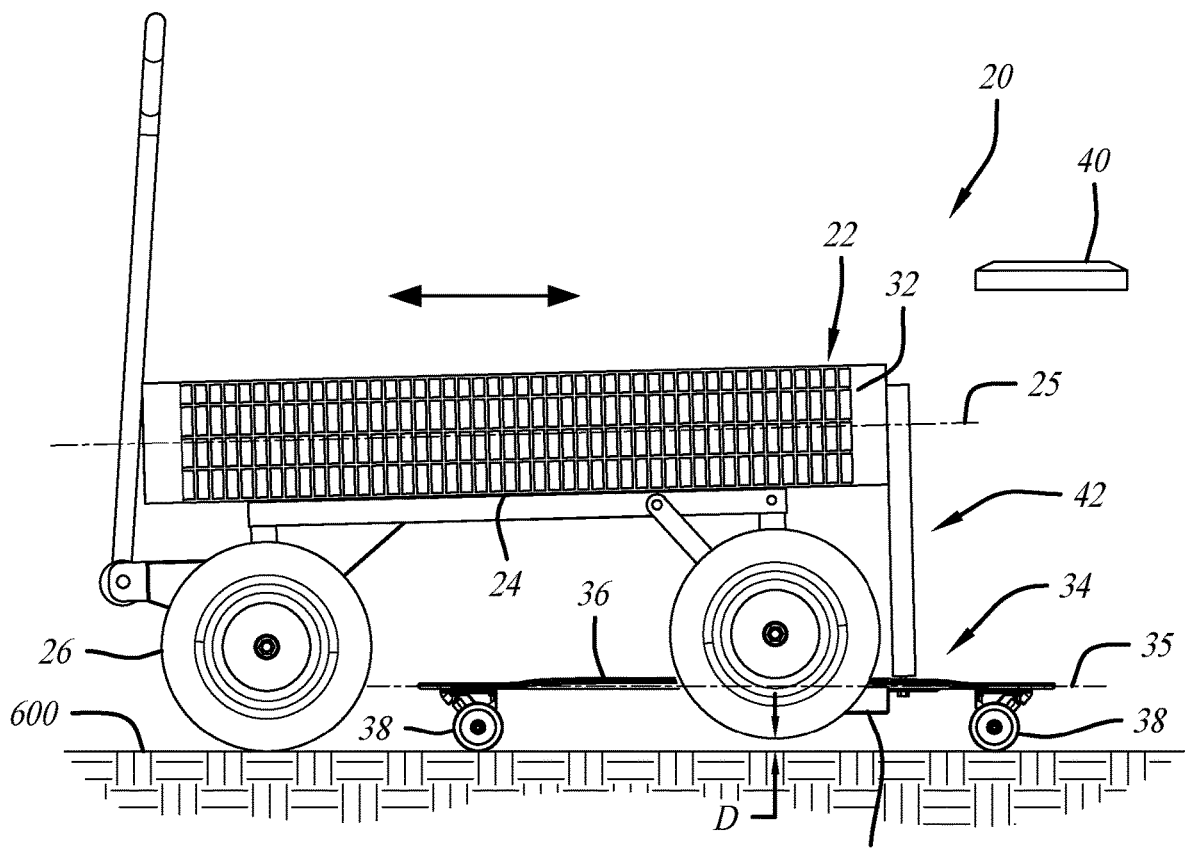
FIG. 3 is a side elevation view of the hauling vehicle.

Hauling vehicle 20 further includes a custom designed bracket 42 which removably connects powered board 34 to hauler 22 so that body 36 of powered board 34 is disposed below bed 24 of hauler 22 (refer to FIG. 3). In the shown embodiment, bracket 42 is removably connected to rear upstanding wall 32. Bracket 42 is attached to hauler 22 with four bolts and nuts, and has one diagonal cross member for bracing and one horizontal member for attaching powered board 34. The powered board 34 attaches to bracket 42 with a mechanical attachment. In the shown embodiment two holes are drilled in body 36 of powered board 34 to effect the connection to bracket 42. Referring specifically to FIG. 3 it is noted that powered board 34 is set in bracket 42 so that the rear powered board wheels 38 (the drive wheels) are approximately ½" lower than the rear wheels 28 of hauler 22. This maintains a steady load on the powered board wheels 38 for traction. As such, the hauler 22 rests upon its two front wheels 26 and the rear powered board wheels 38. The rear hauler wheels 28 are only intermittently in contact with the support surface 600 similar to training wheels on a bicycle. In the shown embodiment, bracket 42 is removably connected to the rear upstanding wall 32 of hauler 22, and to the body 36 of powered board 34. However, it may be appreciated that other connection points of bracket 42 to hauler 22 and powered board 34 are possible.

Figure 4:
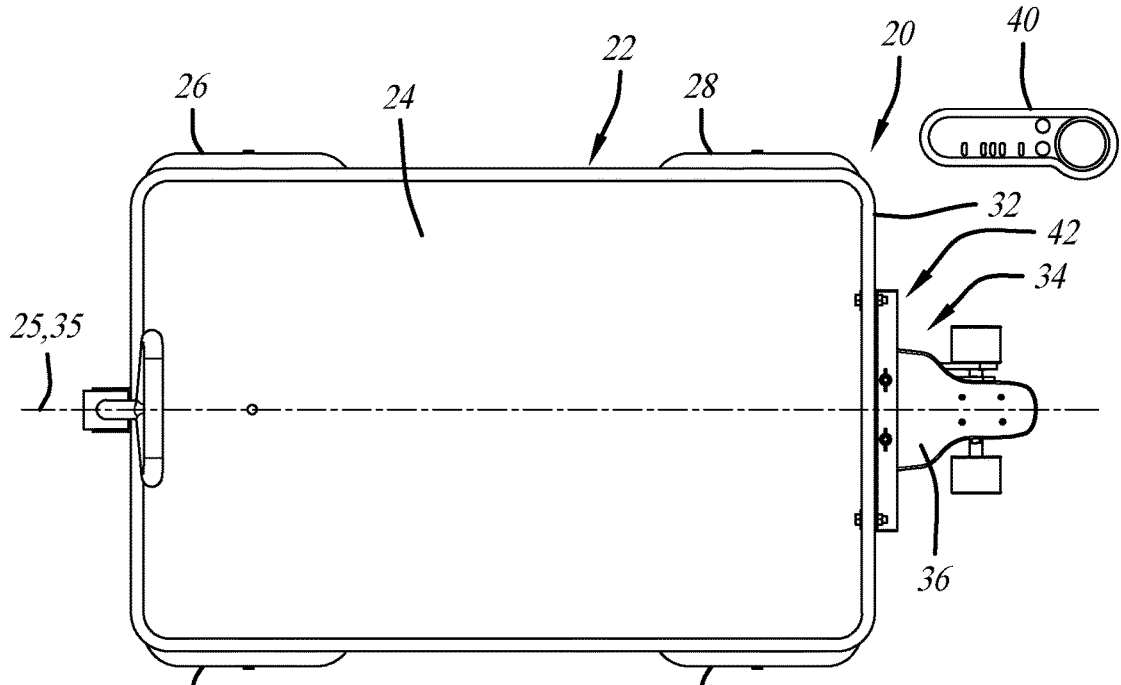
FIG. 4 is a top plan view of the hauling vehicle; and,
FIG. 5 is a perspective view of the power source detached.

Referring to FIG. 3, hauling vehicle 20 is positioned upon a support surface 600. Four powered board wheels 38 rest upon the support surface 600. The two front hauler wheels 26 of hauler 22 rest upon support surface 600, and the two rear hauler wheels 28 of hauler 22 are elevated a distance D above support surface 600. In an embodiment, the elevated distance is about 0.5 inches. Referring to FIGS. 3 and 4, hauler 22 has a first longitudinal axis 25, and powered board 34 has a second longitudinal axis 35. First longitudinal axis 25 and second longitudinal axis 35 are coplanar.

Figure 5:
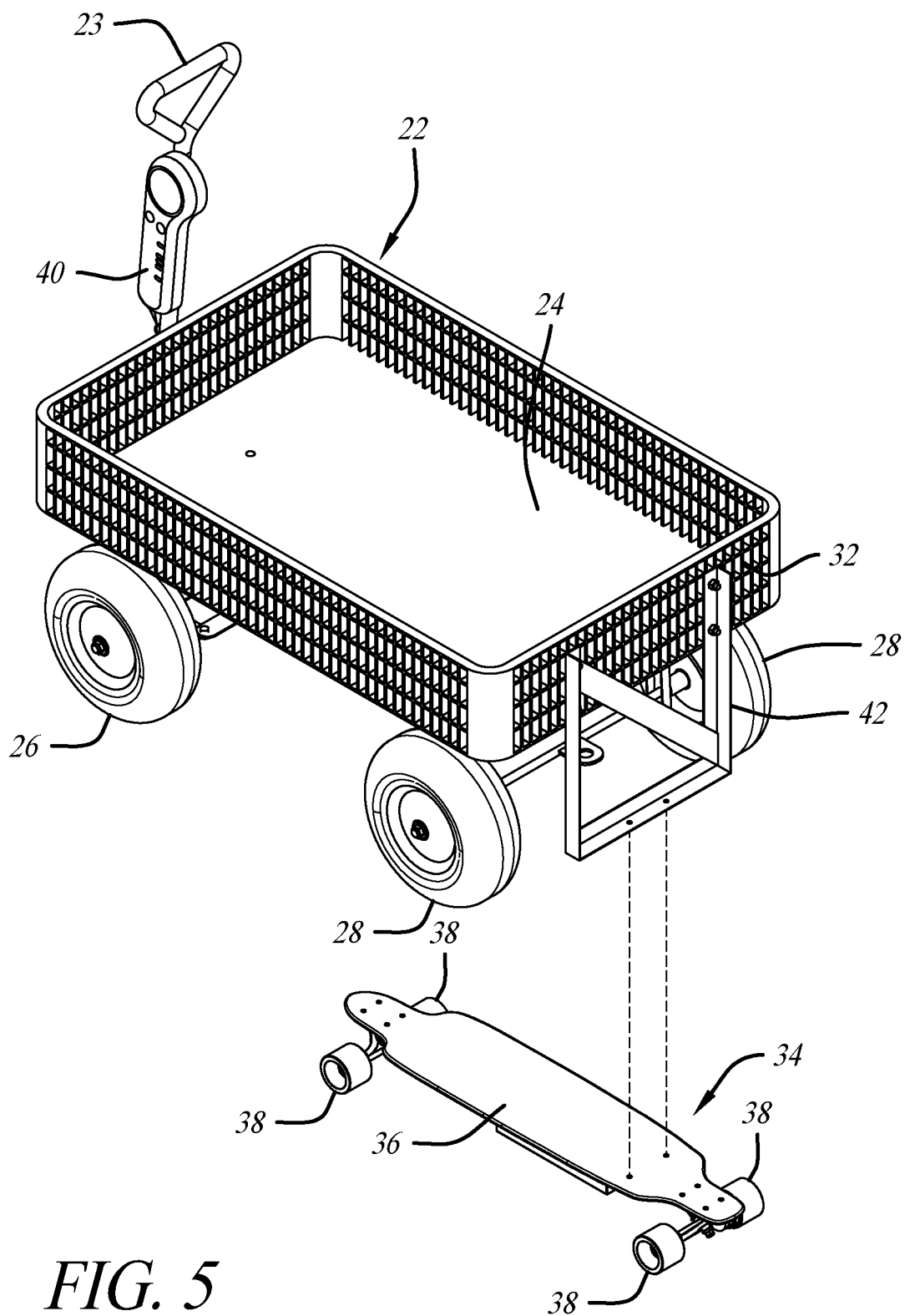

FIG. 5 is a perspective view of the power source powered board 34 detached from hauler 22 so that it can be stored in a protected location. In the shown embodiment powered board 34 is disconnected from bracket 42, However it may be appreciated that the detachment could also be effected by disconnecting bracket 42 from hauler 22 and leaving it attached to powered board 34. Also in FIG. 5, in another embodiment remote controller 40 is connected to the handle 23 of hauler 22. 7. In terms of use, a method for transporting a load 500 includes: (refer to FIGS. 1-5

(a) providing a hauler 22 having a bed 24;
(b) providing a powered board 34 having a body 36, four powered board wheels 58, a rechargeable battery 39, and a remote controller 40;
(c) providing a bracket 42;
(d) connecting the bracket 42 to the hauler and to the powered board 34 to form a hauling vehicle 20 in which the body 36 of the powered board 34 is disposed below the bed 24 of the hauler 22;
(e) placing the load 500 in the bed 24 of the hauler 22; and,
(f) using the remote controller 40 to move the hauling vehicle 20.

The method further including:
in (a), the hauler 22 including a rear upstanding wall 32; and,
in (d), the bracket 42 removably connected to the rear upstanding wall 32.

The method of further including:
in (d), the bracket 42 removably connected to the body 36 of the powered board 34.

The method of further including:
providing a support surface 600;
before (e), positioning the hauling vehicle 20 upon the support surface 600 so that the four powered board wheels 38 rest upon the support surface 600:
in (a), the hauler 22 having two front hauler wheels 26 and two rear hauler wheels 28;
in (d), the two front hauler wheels 26 resting upon the support surface 600; and,
in (d), the two rear hauler wheels 28 elevated a distance above the support surface 600.

The method further including:
the elevated distance being about 0.5 inches.

The method further including:
in (a), the hauler 22 having a first longitudinal axis 25;
in (b), the powered board having a second longitudinal axis 35; and,
the first longitudinal axis 25 and the second longitudinal axis 35 being coplanar.

The method of further including:
providing a secure location which is protected from the elements;
after (f), disconnecting the powered board 34 from the hauler 22; and,
transporting the powered board 24 to the secure location.

Unless specifically otherwise stated, and as applicable, the order of performance of the above cited method steps can be changed.

The embodiments of the hauling vehicle and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the hauling vehicle and method should be construed as limiting the invention to a particular embodiment or combination of embodiments. The scope of the invention is defined by the appended claims.

We claim:

1. A hauling vehicle, the hauling vehicle positioned upon a support surface, the hauling vehicle comprising:
a hauler having a bed;
a powered board having a body, four wheels including rear wheels, a rechargeable battery, and a remote controller;
a bracket which removably connects said powered board to said hauler so that said body of said powered board is disposed below said bed of said hauler;
said hauler having two front hauler wheels and two rear hauler wheels;
said two front hauler wheels resting upon the support surface;
said two rear hauler wheels elevated a distance above the support surface, and,
said rear wheels of said powered board extending below said rear hauler wheels and resting upon the support surface.

2. The hauling vehicle according to claim 1 further including:
said hauler including a rear upstanding wall; and,
said bracket removably connected to said rear upstanding wall.

3. The hauling vehicle according to claim 1 further including:
said bracket removably connected to said body of said powered board; and,
two holes drilled in said body of said powered board.

4. The hauling vehicle according to claim 1 further including:
said rear hauler wheels only intermittently contacting the support surface.

5. The hauling vehicle according to claim 1 further including:
said elevated distance being about 0.5 inches.

6. The hauling vehicle according to claim 1 further including:
said hauler having a first longitudinal axis;
said powered board having a second longitudinal axis; and,
said first longitudinal axis and said second longitudinal axis being coplanar.

7. The hauling vehicle according to claim 1 further including:
said hauler having a handle; and,
said remote controller connected to said handle.

8. The hauling vehicle according to claim 1 further including:
said hauler including a rear upstanding wall;
said bracket removably connected to said rear upstanding wall;
said elevated distance being about 0.5 inches;
two holes drilled in said body of said powered board;
said hauler having a first longitudinal axis;
said powered board having a second longitudinal axis;
said first longitudinal axis and said second longitudinal axis being coplanar;
said rear hauler wheels only intermittently contacting the support surface; and,
said hauler having a handle, said remote controller connected to said handle.

9. A method for transporting a load comprising:
(a) providing a support surface;
(b) providing a hauler having a bed, two front hauler wheels, and two rear hauler wheels;
(c) providing a powered board having a body, four powered board wheels including rear wheels, a rechargeable battery, and a remote controller;
(d) providing a bracket;
(e) connecting said bracket to said hauler and to said powered board to form a hauling vehicle in which said body of said powered board is disposed below said bed of said hauler;
(f) positioning said hauling vehicle upon said support surface so that said rear wheels of said powered board rest upon said support surface, said two front hauler wheels rest upon said support surface, and said two rear hauler wheels are elevated a distance above said support surface, and said rear wheels of said powered board extend below said rear hauler wheels;
(g) placing the load in said bed of said hauler; and,
(h) using said remote controller to move said hauling vehicle.

10. The method of claim 9 further including:
in (b), said hauler including a rear upstanding wall; and,
in (e), said bracket removably connected to said rear upstanding wall.

11. The method of claim 9 further including:
in (e), said bracket removably connected to said body of said powered board, and,
in (c), two holes drilled in said body of said powered board.

12. The method of claim 9, further including:
in (f) said rear hauler wheels only intermittently contacting the support surface.

13. The method of claim 9 further including:
said elevated distance being about 0.5 inches.

14. The method of claim 9 further including:
in (b), said hauler having a first longitudinal axis;
in (c), said powered board having a second longitudinal axis; and,
said first longitudinal axis and said second longitudinal axis being coplanar.

15. The method of claim 9 further including:
providing a secure location which is protected from the elements;
after (h), disconnecting said powered board from said hauler; and,
transporting said powered board to said secure location.

* * * * *